United States Patent
Kupratis et al.

(10) Patent No.: US 11,168,616 B2
(45) Date of Patent: Nov. 9, 2021

(54) HYBRID ELECTRIC FAN WITH IMPROVED LOW PRESSURE COMPRESSOR

(71) Applicant: United Technologies Corporation, Farmington, CT (US)

(72) Inventors: Daniel Bernard Kupratis, Wallingford, CT (US); Christopher J. Hanlon, Sturbridge, MA (US); William G Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 503 days.

(21) Appl. No.: 15/980,870

(22) Filed: May 16, 2018

(65) Prior Publication Data

US 2019/0353104 A1 Nov. 21, 2019

(51) Int. Cl.
*F02C 7/36* (2006.01)
*F02C 6/00* (2006.01)
(Continued)

(52) U.S. Cl.
CPC .............. *F02C 7/36* (2013.01); *F02C 6/00* (2013.01); *F02C 9/00* (2013.01); *F02K 3/06* (2013.01); *F16H 1/28* (2013.01); *H02K 7/116* (2013.01); *H02K 7/14* (2013.01); *H02K 7/1823* (2013.01); *F05D 2220/323* (2013.01); *F05D 2220/70* (2013.01); *F05D 2260/40311* (2013.01);
(Continued)

(58) Field of Classification Search
CPC .. F02C 3/113; F02C 3/107; F02C 7/32; F02C 7/36; F02C 6/00; F02C 9/00; B64D 2027/026; F16H 1/28; F02K 3/06; F02K 5/00; H02K 7/116; H02K 7/14; H02K 7/1723; F05D 2220/323; F05D 2220/70; F05D 2260/40311; F05D 2270/02; F05D 2270/051; F05D 2270/101; F05D 2270/20
See application file for complete search history.

(56) References Cited

U.S. PATENT DOCUMENTS 4,005,575 A * 2/1977 Scott ..................... F02C 9/18
60/226.1
8,324,746 B2 12/2012 Bradbrook
(Continued)

FOREIGN PATENT DOCUMENTS

GN 107178426 9/2017

OTHER PUBLICATIONS

European Search Report for EP Application No. 19174692.4 dated Oct. 4, 2019.

*Primary Examiner* — Jason H Duger
(74) *Attorney, Agent, or Firm* — Carlson, Gaskey & Olds, P.C.

(57) ABSTRACT

A gas turbine engine according to an exemplary embodiment of this disclosure includes among other possible things, a fan section including a plurality of fan blades, a first electric motor assembly that provides a first drive input for driving the fan blades about an axis, a turbine section, and a geared architecture driven by the turbine section and coupled to the fan section to provide a second drive input for driving the fan blades, and second electric motor assembly is coupled to rotate the geared architecture relative to a fixed structure controls a speed of the fan blades provided by a combination of the first drive input and the second drive input.

13 Claims, 5 Drawing Sheets

(51) Int. Cl.
   *F02C 9/00*      (2006.01)
   *F02K 3/06*      (2006.01)
   *F16H 1/28*      (2006.01)
   *H02K 7/116*     (2006.01)
   *H02K 7/14*      (2006.01)
   *H02K 7/18*      (2006.01)

(52) U.S. Cl.
   CPC .... *F05D 2270/02* (2013.01); *F05D 2270/051* (2013.01); *F05D 2270/101* (2013.01); *F05D 2270/20* (2013.01)

(56) References Cited

U.S. PATENT DOCUMENTS

| | | | |
|---|---|---|---|
| 2004/0255590 A1* | 12/2004 | Rago | F02C 7/32 60/772 |
| 2014/0290265 A1* | 10/2014 | Ullyott | F02C 3/113 60/773 |
| 2016/0369702 A1 | 12/2016 | Otto et al. | |
| 2017/0211474 A1* | 7/2017 | Sennoun | F02C 6/00 |

* cited by examiner

HYBRID ELECTRIC FAN WITH IMPROVED LOW PRESSURE COMPRESSOR

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

The fan section typically provides a majority of propulsive thrust for the engine. Adjusting a speed of the fan to provide more efficient operation requires adjustment of a speed of the drive turbine. A geared architecture between the fan and the drive turbine enables both to operate closer to optimal speeds. However, the drive turbine and fan are still mechanically linked and therefore any changes in speed to adjust fan speed also changes the speed of the drive turbine. Moreover, the drive turbine typically drives a low pressure compressor. Changing speeds of the low pressure compressor can complicate operation and place constraints on the speed of the fan.

Although improved technology and materials have improved engine efficiency, turbine engine manufacturers continue to seek further improvements to engine performance including improvements to thermal, transfer and propulsive efficiencies.

SUMMARY

A gas turbine engine according to an exemplary embodiment of this disclosure includes among other possible things, a fan section including a plurality of fan blades, a first electric motor assembly that provides a first drive input for driving the fan blades about an axis, a turbine section, and a geared architecture driven by the turbine section and coupled to the fan section to provide a second drive input for driving the fan blades, and second electric motor assembly is coupled to rotate the geared architecture relative to a fixed structure controls a speed of the fan blades provided by a combination of the first drive input and the second drive input.

In a further embodiment of the foregoing gas turbine engine, the second electric motor assembly includes a first electric motor for rotating the geared architecture in a first direction and a second electric motor for rotating the geared architecture in a second direction.

In a further embodiment of any of the foregoing gas turbine engines, a first clutch assembly is disposed between the first electric motor and the geared architecture and a second clutch assembly disposed between the second electric motor and the geared architecture, wherein the first clutch assembly enables input from the first electric motor in only the first direction and the second clutch assembly enables input from the second electric motor in only the second direction.

In another embodiment of any of the foregoing gas turbine engines, the geared architecture includes a sun gear driving a plurality of intermediate gears circumscribed by a ring gear with a carrier supporting the plurality of intermediate gears. A driven gear is coupled to the geared architecture and driven by one of a first drive gear driven by the first electric motor and a second drive gear driven by the second electric motor.

In another embodiment of any of the foregoing gas turbine engines, the driven gear is coupled to the carrier.

In another embodiment of any of the foregoing gas turbine engines, the driven gear is coupled to the ring gear.

In another embodiment of any of the foregoing gas turbine engines, the geared architecture includes a sun gear driving a plurality of intermediate gears circumscribed by a ring gear and the fan section includes a fan shaft coupled to the ring gear.

In another embodiment of any of the foregoing gas turbine engines, the geared architecture includes a sun gear driving a plurality of intermediate gears circumscribed by a ring gear with a carrier supporting the plurality of intermediate gears and the fan section includes a fan shaft coupled to the carrier.

In another embodiment of any of the foregoing gas turbine engines, a compressor includes a section with a low pressure compressor and the turbine section includes a low pressure turbine that drives both the low pressure compressor and the geared architecture.

In another embodiment of any of the foregoing gas turbine engines, the low pressure compressor is driven by the low pressure turbine at a speed different then the fan section.

In another embodiment of any of the foregoing gas turbine engines, the second electric motor assembly is configured such that rotation of the geared architecture in a first direction enables an increase of a speed of the fan section. Rotation in a second direction enables a decrease of a speed of the fan without a change in speed of the second driving input provided by the turbine section.

In another embodiment of any of the foregoing gas turbine engines, the first electric motor assembly drives the fan in the first direction to increase fan speed.

In another embodiment of any of the foregoing gas turbine engines, the second electric motor assembly is configured such that rotation of the geared architecture enables a speed of the fan to remain constant with a change in speed of the second driving input provided by the turbine section.

In another embodiment of any of the foregoing gas turbine engines, a controller includes a commanding operation of both of the first electric motor assembly and the second electric motor assembly to provide a predefined rotational speed of the fan.

Another gas turbine engine according to an exemplary embodiment of this disclosure includes among other possible things, a fan section including a plurality of fan blades. A first electric motor assembly provides a first drive input for driving the fan blades about an axis, a turbine section, a geared architecture driven by the turbine section and coupled to the fan section to provide a second drive input for driving the fan blades. A means for rotating the geared architecture relative to a fixed structure to control a speed of the fan blades is provided by a combination of the first drive input and the second drive input.

In a further embodiment of the foregoing gas turbine engine, the means for rotating includes a first electric motor for rotating the geared architecture in a first direction and a second electric motor for rotating the geared architecture in a second direction.

In another embodiment of any of the foregoing gas turbine engines, a first clutch assembly is disposed between the first electric motor and the geared architecture. A second clutch assembly is disposed between the second electric motor and the geared architecture. The first clutch assembly enables input from the first electric motor in only the first direction and the second clutch assembly enables input from the second electric motor in only the second direction.

A method of operating a gas turbine engine according to another exemplary embodiment of this disclosure includes, among other possible things, coupling a first electric motor assembly to a fan section providing a first drive input for driving the fan blades and coupling a geared architecture driven by a turbine section of the engine to the fan section for providing a second drive input to drive the fan blades. Coupling a second electric motor assembly to rotate the geared architecture relative to a static engine structure and controlling the first electric motor assembly and the second electric motor assembly to provide a combination of the first drive input and the second drive to rotate the fan blades at a predefined rotational speed.

In a further embodiment of the foregoing method of operating a gas turbine engine, the second electric motor assembly includes a first electric motor and a second electric motor that are coupled to a drive gear mounted to the geared architecture. Driving the geared architecture in a first direction with the first electric motor increases a rotational speed of the fan blades and driving the geared architecture in a second direction with the second electric motor decreases a rotational speed of the fan blades without a change in speed of the turbine section driving the geared architecture.

In a further embodiment of the foregoing method of operating a gas turbine engine, coupling a first clutch assembly between the first electric motor and the drive gear and coupling a second clutch assembly between the second electric motor and the drive gear. The first electric motor and the second electric motor only drive the geared architecture in a single direction.

In a further embodiment of the foregoing method of operating a gas turbine engine, the first electric motor assembly and the second electric motor assembly operate to maintain a rotational speed of the fan blades while decreasing a speed of a low pressure compressor driven by the turbine section.

In a further embodiment of the foregoing method of operating a gas turbine engine, the first electric motor assembly is mounted to drive a fan shaft.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
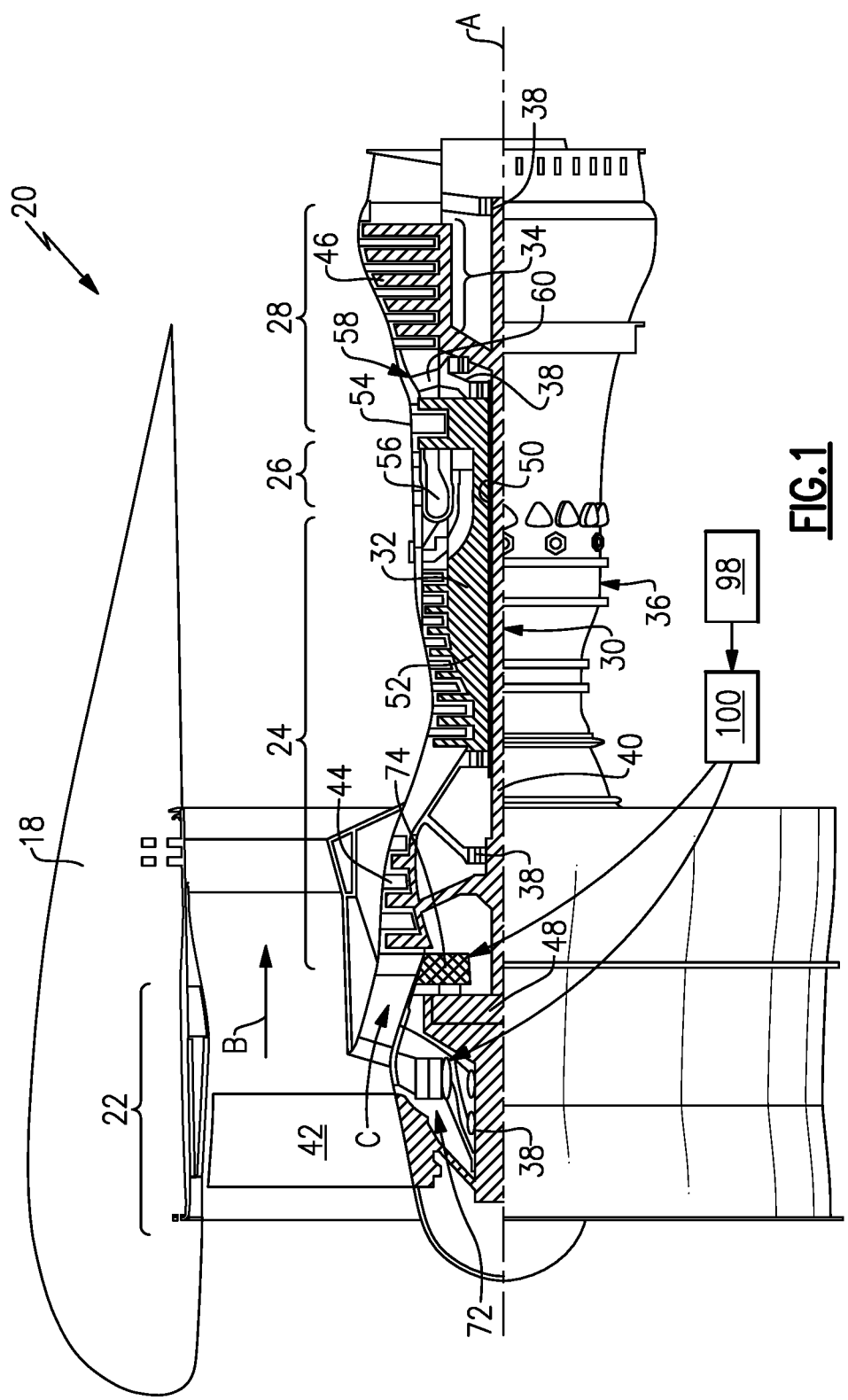
FIG. 1 is a schematic view of an example gas turbine engine including a fan drive electric motor assembly.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan section 22 through a speed change mechanism, which in the exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56 to generate a high energy flow that is expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44, and fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine 20 includes a first electric motor assembly 72 that is coupled to drive the fan section 22. A second electric motor assembly 74 is coupled to drive the geared architecture 48 relative to the static structure 36 of the engine 20. The first and second electric motor assemblies 72, 74 enable the fan blades 42 to rotate about the axis A at a speed different than provided by the geared architecture 48.

Changes to propulsive thrust provided by the fan section 22 require a corresponding change of speed of the low pressure turbine 46. The low pressure turbine 46 also drives the low pressure compressor 44 and results in changes in speed of the low pressure compressor 44. Increasing the speed of the low pressure compressor 44 may result in the compressor rotating at speeds that do not provide efficient operation or that provide pressures and flows that are not within desired ranges for efficient operation of the high pressure compressor 52. Performance of the low-pressure compressor 44 is matched to the operation of the high-pressure compressor 52 to provide the most efficient use of energy and provide optimal engine operating conditions. Inputting additional power by increasing the speed of the low-pressure compressor 44 may disrupt the matched performance between the low-pressure compressor 44 and the high-pressure compressor 52.

The example gas turbine engine 20 includes the first electric motor assembly 72 that boosts a speed of rotation of the fan blades 42 about the axis A to a speed greater than that provided by the output of the geared architecture 48. The geared architecture 48 is driven relative to the static structure 36 of the engine by the second electric motor assembly 74. The geared architecture 48 is not structurally grounded directly to the static engine structure 36 but is instead mechanically grounded to the engine static 36 structure through the electric motor assembly 74. It should be understood that various bearing systems 38 at various locations may alternatively or additionally be provided, and the location of bearing systems 38 may be varied as appropriate to the application. The electric motor assembly 74 rotates the geared architecture 48 to partially decouple fan speed from a speed provided by the low pressure turbine 46 through the geared architecture 48.

Figure 2:
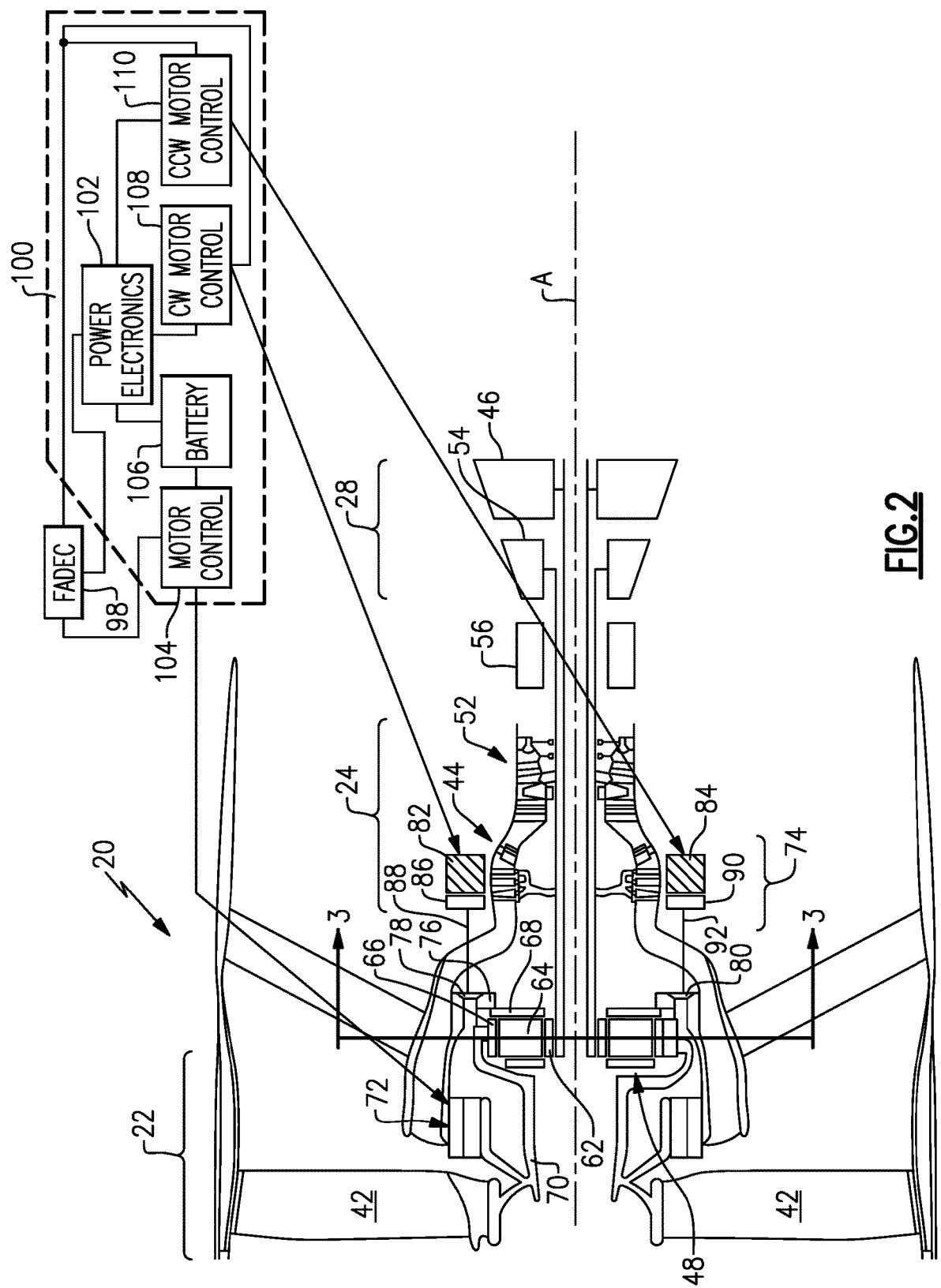
FIG. 2 is a schematic representation of the example gas turbine engine and fan drive electric motor assembly.

Referring to FIG. 2 the example gas turbine engine 20 is shown schematically and includes the first electric motor assembly 72 that is disposed on a fan shaft 70 that supports the plurality of fan blades 42. The first motor assembly 72 provides a first drive input for driving the fan blades 42 about the axis and is operated by a motor control 104 that is a part of a motor controller 100. The example motor controller 100 can receive information from an engine control such as in this example a Full Authority Digital Electronic Control (FADEC) 98. The electric motor 72 inputs power directly to the fan shaft 70 to provide a boost of power directly to the fan section 22. The increased power provided by the electric motor 72 enables a boost to the speed of the fan section 22 independent of the low pressure turbine 46. The geared architecture 48 provides a second drive input to drive the fan blades 42 about the axis A.

The second electric motor assembly 74 includes a first electric motor 82 and a second electric motor 84 that are both coupled to drive a driven gear 76 that is attached to a carrier 68. The example geared architecture 48 includes a sun gear 62 driven by the shaft 40. The sun gear 62 in turns drives intermediate gears 64 that are supported on the carrier 68. The intermediate gears 68 are circumscribed by a ring gear 66. The ring gear 66 is coupled to drive the fan shaft 70. The driven gear 76 is a single gear that is attached to the carrier 68 and is coupled to a first drive gear 78 and second driven gear 80. The disclosed gear architecture 48 is not directly coupled to the engine static structure 36 but is instead rotatable about the axis A independent of rotation of the shaft 40.

The first electric motor 82 includes a first clutch 86. The electric motor 82 drives the first shaft 88 that drives the first drive gear 78 that is coupled to the driven gear 76. The driven gear 76 is a gear that is disposed about the axis A and rotates the geared architecture 48. It should be understood that various bearing systems 38 at various locations may alternatively or additionally be provided, and the location of bearing systems 38 may be varied as appropriate to the application.

The second electric motor 84 drives a second shaft 92 and the second drive gear 80. A second clutch 90 is provided to enable the electric motor 84 to drive the driven gear 76 in only one direction. Moreover the first clutch 86 driven by the first electric motor 82 is able to drive the driven gear 76 in only a single direction. In one disclosed embodiment, the first electric motor 82 drives the driven gear 76 in a clockwise or first direction and the second electric motor 84 drives the second driven gear 76 in a counterclockwise or second direction. It should be appreciated, that although the first electric motor 82 and the second electric motor 84 are depicted as a single electric motor, multiple electric motors could be utilized and are within the contemplation of this disclosure.

The example controller 100 includes the motor controller 104 that commands operation of the first electric motor assembly 72, a power source 106 and electronics 102 required to drive and command operation of the first electric motor assembly 72. The controller 100 further includes a motor controllers 106 and 108 that control operation of the corresponding first and second electric motors 82 and 84 of the second electric motor assembly 74. The example controller 100 may be provided as part of the engine controller or may be a separate controller for the first and second electric motor assemblies 72, 74. Additionally, the controller 100 can be implemented as hardware or software. The power source 106 maybe a battery or generator powered by the engine 20.

Figure 3:
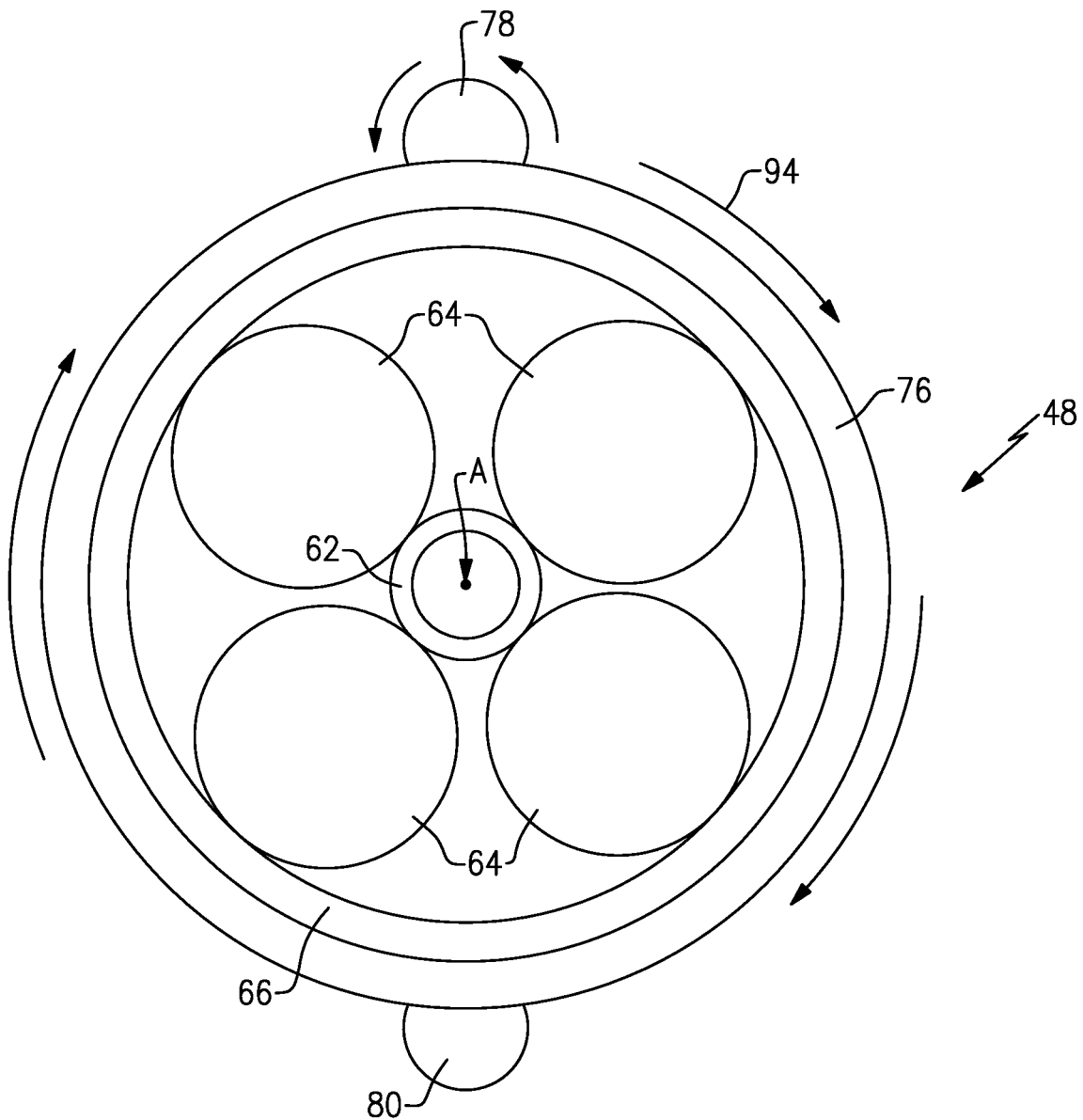
FIG. 3 is a schematic view of an example geared architecture and gear drive electric motor assembly.

Referring to FIG. 3 with continued reference to FIG. 2, operation of the example gas turbine engine 20 to provide a boost to the fan section 22 enables the speed of the fan blades 42 to be increased or decreased independent of the speed provided by the low pressure turbine 46 and geared architecture 48. In one disclosed example operation of the gas turbine engine 20, increase the fan speed 42 without increasing the speed of the low pressure turbine 46 includes inputting power to drive the first electric motor 72 to drive the fan blades 42. The increase boost of power provided by the first electric motor assembly alone is not possible unless the fan shaft 70 is decoupled from input from the low pressure turbine 46. In this example the decoupling of the direct input from the fan shaft 46 is enabled by rotation of the geared architecture 48. In this example the sun gear 62 rotates counterclockwise.

In the embodiment disclosed in FIG. 3, the first electric motor 82 drives the first drive gear 78 to drive the driven gear 76 and thereby the geared architecture 48 in a first clockwise direction 94. In the clockwise direction 94 the fan section 22 may rotate at a faster speed than that provided by the low pressure turbine 46 and geared architecture 48.

Operation of the first electric motor 82 to drive the geared architecture 48 in the first direction 94 enables an increase speed of the fan section 42 independent of speed of the low pressure turbine 46 and thereby the sun gear 62.

The first clutch assembly 86 is a one way clutch such that the electric motor 82 may only drive the first shaft 88 in the first direction. The second electric motor 84 and the second clutch 90 enables the second electric motor 84 to drive the shaft 92 in a second direction. When the first electric motor 82 engages to drive the geared architecture 48, the second clutch 90 decouples the second electric motor 84 such that no driving input is provided by the second electric motor 84. In this example the sun gear 62 rotates counterclockwise.

Figure 4:
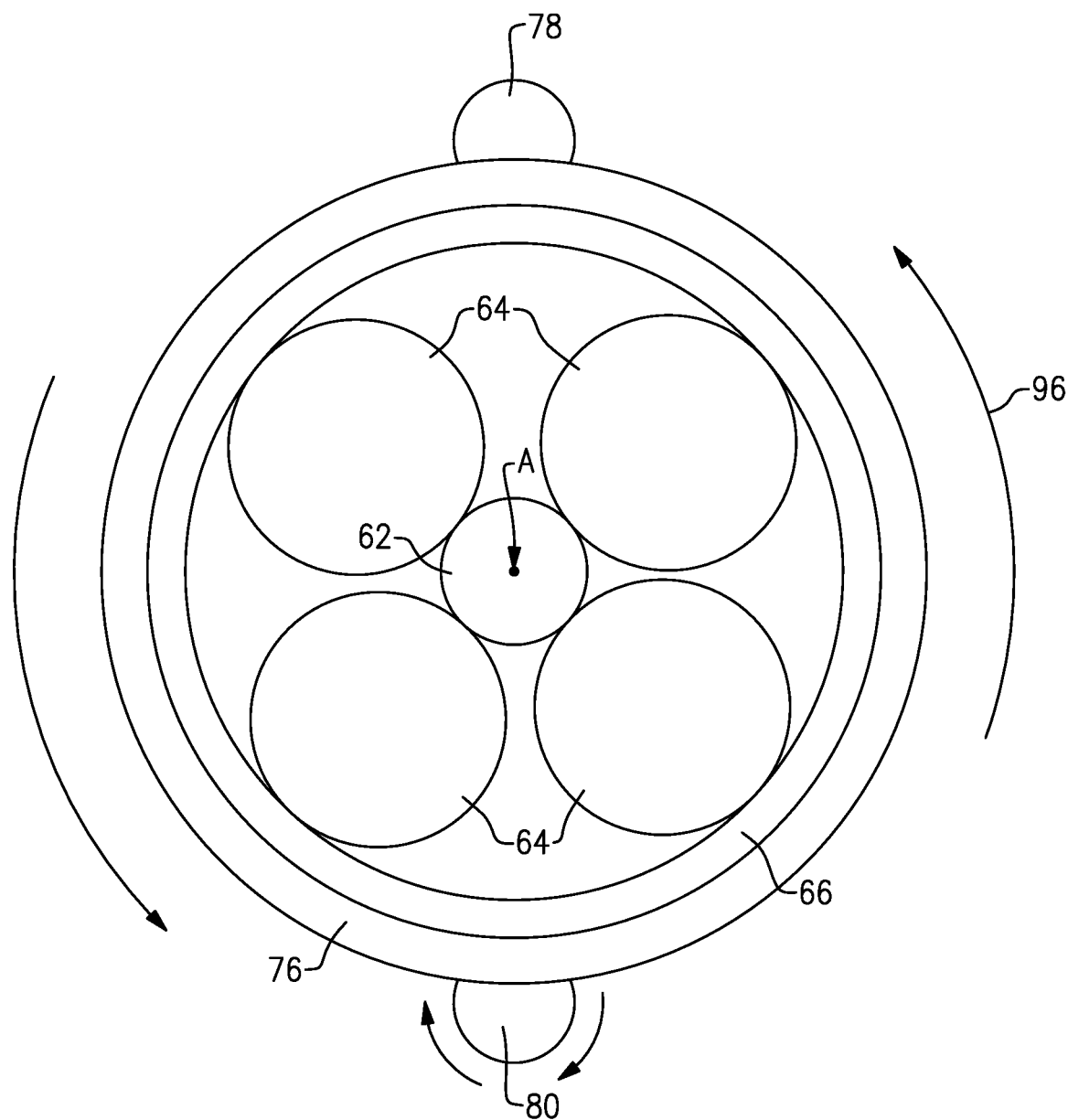
FIG. 4 is another schematic view of the geared architecture and gear drive electric motor assembly.

Referring for FIG. 4 with continued reference to FIGS. 2 and 3, another example operational condition is illustrated where the second electric motor 84 is driving the second gear 80 in a second counterclockwise direction 96. In the second direction 96 the geared architecture 48 is rotated in a counterclockwise direction and provides for a reduction in fan speed relative to the input provided by the low pressure turbine 46. The reduction in the fan speed is independent of the input speed provided by the low pressure turbine 46. Accordingly the fan speed 42 is decoupled from the input provided by the low pressure turbine 46 and the geared architecture 48.

In another operational phase of the example gas turbine engine 20, neither the first electric motor 82 nor the second electric motor 84 is operational thereby locking the geared architecture in a fixed position. In the fixed position, the low pressure turbine 46 drives the geared architecture 48 and thereby the fan section 22 at a constant speed dictated by the structure and gear ratio of the geared architecture 48. The first electric motor assembly 72 is not operated and the engine operates with the fan blades 42 turning at a speed that corresponds with the low pressure turbine 46 and the gear ratio provided by the gear architecture 48. In another operational phase of the example gas turbine engine 20 the first electric motor assembly 72 provides a boost to fan shaft 70 speed of rotation of the fan blades 42 about the axis A to a speed greater than that provided by the output of the geared architecture 48.

In the disclosed embodiment shown in FIG. 2, the first electric motor assembly 72 that is coupled to drive the fan section 22 is a motor. However the assembly 72 may comprise of a motor-generator that provides a load to fan shaft 70 speed of rotation of the fan blades 42 about the axis A to a speed smaller than that provided by the output of the geared architecture 48.

In the disclosed embodiment shown in FIG. 2, the first electric motor 82 and the second electric motor 84 are each illustrated as a single electric motor. However, each of the first electric motor and second electric motor 82, 84 may comprise several electric motors that are each engaged to the driven gear 76 to provide rotation of the geared architecture relative of the engine static structure in either the first direction 94 or the second direction 96.

Moreover the first electric motor assembly 72 is illustrated as a motor including a first static part fixed to a static structure and a second rotor part that is attached to a portion of the fan shaft 70. It should be appreciated that although the first electric motor assembly 72 is schematically shown as a single electric motor mounted to and coupled as part of the fan shaft 70 that other configurations and separate electric motors could be utilized including an electric motor that drives the fan shafts 70 through a gear system or other drive configuration.

Additionally in the disclosed example the driven gear 76 is coupled to rotate the carrier 66 relative to the engine static structure 36. The ring gear 66 is fixed to and is coupled to drive the fan shaft 70. However, other configurations of a geared architecture could be utilized and are within the contemplation of this invention.

Figure 5:
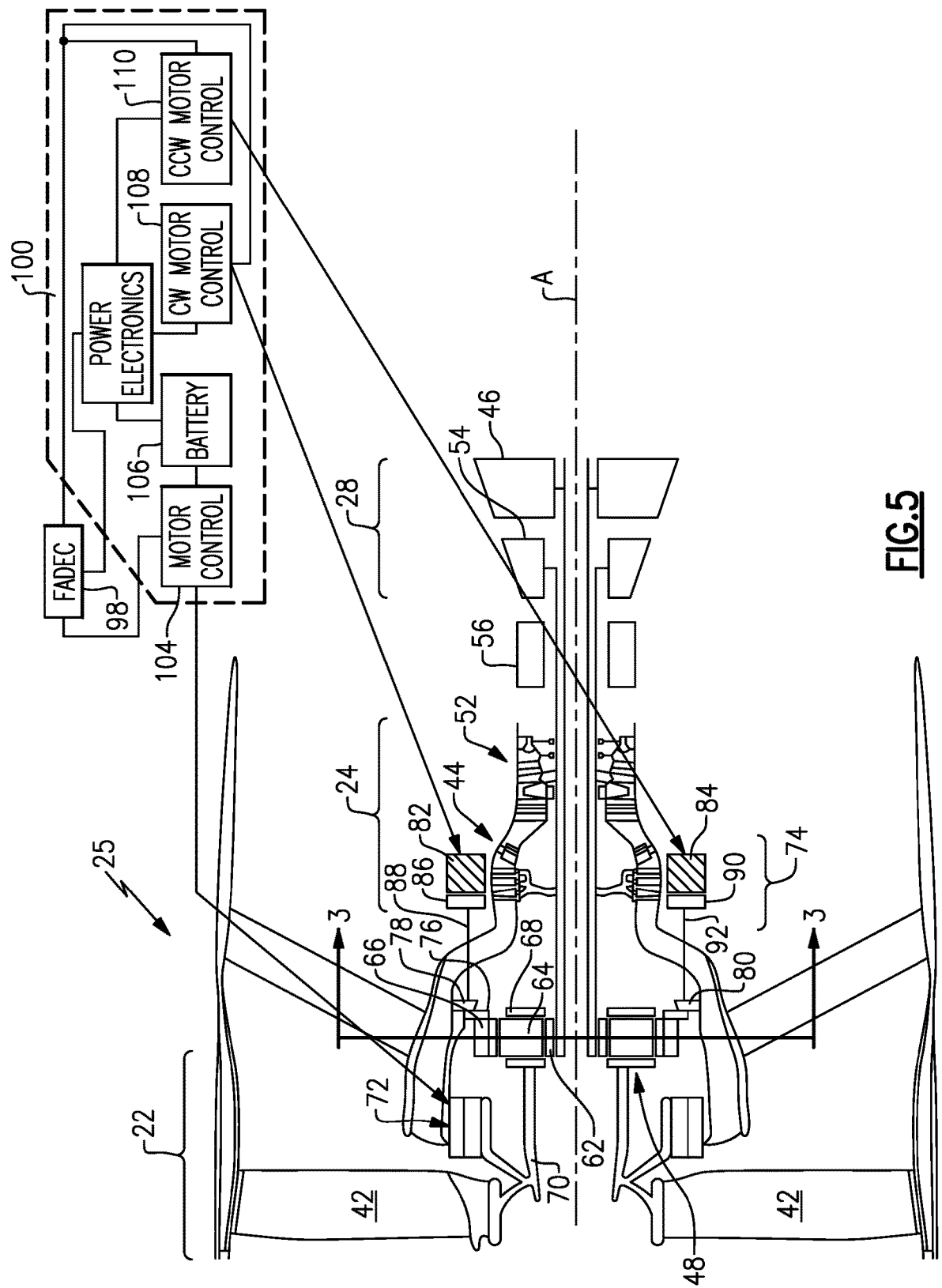
FIG. 5 is another example gas turbine engine and fan drive electric motor assembly.

Referring to FIG. 5 another gas turbine engine 25 is schematically shown and includes another geared architecture 45. The geared architecture 45 includes the ring gear 68 that is coupled to the driven gear 76. The carrier 68 is coupled to drive the fan shaft 70. Operation of the engine illustrated in FIG. 5 would proceed as is described above with regard to the disclosed engine 20 and in this example the sun gear 62 rotates clockwise. The application or mounting of the driven gear 76 to the ring gear 66 instead of the carrier 68 enables other gear ratios and operational structures that may be utilized within the contemplation of this disclosure.

Accordingly, the example disclosed engines 20, 25 provided a boost of power to the fan section 22 independent of power provided by the low pressure turbine 46 and geared architecture 48 to enable an increase in thrust produced by the fan section 22 independent of the low speed spool 30.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
  a fan section including a plurality of fan blades and a first electric motor assembly providing a first drive input for driving the fan blades about an axis;
  a turbine section;
  a geared architecture driven by the turbine section and coupled to the fan section to provide a second drive input for driving the fan blades;
  a second electric motor assembly coupled to rotate the geared architecture relative to a fixed structure to control a speed of the fan blades provided by a combination of the first drive input and the second drive input, wherein the second electric motor assembly includes a first electric motor for rotating the geared architecture in a first direction and a second electric motor for rotating the geared architecture in a second direction;
  a first clutch assembly disposed between the first electric motor and the geared architecture; and
  a second clutch assembly disposed between the second electric motor and the geared architecture, wherein the first clutch assembly provides for input from the first electric motor in only the first direction and the second clutch assembly provides for input from the second electric motor in only the second direction.

2. The gas turbine engine as recited in claim 1, wherein the geared architecture includes a sun gear driving a plurality of intermediate gears circumscribed by a ring gear with a carrier supporting the plurality of intermediate gears and a driven gear coupled to the geared architecture and driven by one of a first drive gear driven by the first electric motor and a second drive gear driven by the second electric motor.

3. The gas turbine engine as recited in claim 2, wherein the driven gear is coupled to the carrier.

4. The gas turbine engine as recited in claim 2, wherein the driven gear is coupled to the ring gear.

5. The gas turbine engine as recited in claim 1, wherein the geared architecture includes a sun gear driving a plurality of intermediate gears circumscribed by a ring gear and the fan section includes a fan shaft coupled to the ring gear.

6. The gas turbine engine as recited in claim 1, wherein the geared architecture includes a sun gear driving a plurality of intermediate gears circumscribed by a ring gear with a carrier supporting the plurality of intermediate gears and the fan section includes a fan shaft coupled to the carrier.

7. The gas turbine engine as recited in claim 1, including a compressor section with a low pressure compressor and the turbine section includes a low pressure turbine that drives both the low pressure compressor and the geared architecture.

8. The gas turbine engine as recited in claim 7, wherein the low pressure compressor is driven by the low pressure turbine at a speed different then the fan section.

9. The gas turbine engine as recited in claim 1, wherein the second electric motor assembly is configured such that rotation of the geared architecture in a first direction provides an increase of the speed of the fan blades and rotation in a second direction provides a decrease of the speed of the fan blades without a change in speed of the second driving input provided by the turbine section.

10. The gas turbine engine as recited in claim 9, wherein the first electric motor assembly drives the fan blades in the first direction to increase the speed of the fan blades.

11. The gas turbine engine as recited in claim 10, wherein the second electric motor assembly is configured such that rotation of the geared architecture provides the speed of the fan blades to remain constant with a change in speed of the second driving input provided by the turbine section.

12. The gas turbine engine as recited in claim 1, including a controller commanding operation of both of the first electric motor assembly and the second electric motor assembly to provide a predefined value of the speed of the fan blades.

13. A gas turbine engine comprising:
  a fan section including a plurality of fan blades and a first electric motor assembly providing a first drive input for driving the fan blades;
  a turbine section;
  a geared architecture driven by the turbine section and coupled to the fan section to provide a second drive input for driving the fan blades;
  a means for rotating the geared architecture relative to a fixed structure to control a speed of the fan blades provided by a combination of the first drive input and the second drive input, wherein the means for rotating includes a first electric motor for rotating the geared architecture in a first direction and a second electric motor for rotating the geared architecture in a second direction;
  a first clutch assembly disposed between the first electric motor and the geared architecture; and
  a second clutch assembly disposed between the second electric motor and the geared architecture, wherein the first clutch assembly provides for input from the first electric motor in only the first direction and the second clutch assembly provides for input from the second electric motor in only the second direction.

* * * * *